United States Patent [19]

Raskin

[11] 4,215,715
[45] Aug. 5, 1980

[54] POPPET VALVE

[75] Inventor: Paul Raskin, West Orange, N.J.

[73] Assignee: General Pneumatics Corporation, Orange, N.J.

[21] Appl. No.: 14,126

[22] Filed: Feb. 22, 1979

Related U.S. Application Data

[60] Division of Ser. No. 849,118, Nov. 7, 1977, Pat. No. 4,168,720, which is a continuation of Ser. No. 663,474, Mar. 3, 1976, abandoned.

[51] Int. Cl.² .......................................... F16K 31/122
[52] U.S. Cl. .............................. 137/505.18; 251/333
[58] Field of Search .................. 137/505.18; 251/333, 251/356, 63, 120, 121, 122

[56] References Cited

U.S. PATENT DOCUMENTS

| | | | |
|---|---|---|---|
| 3,247,865 | 4/1966 | Doyle | 137/505.18 X |
| 3,249,145 | 5/1966 | Alberani | 137/505.18 X |
| 3,358,964 | 12/1967 | Cohen | 137/505.18 X |
| 3,818,921 | 6/1974 | Peczkowski | 137/505.18 X |
| 3,873,063 | 3/1975 | Illing | 137/505.18 X |
| 3,982,559 | 9/1976 | Ochs | 137/505.18 X |

Primary Examiner—Alan Cohan
Attorney, Agent, or Firm—Lerner, David, Littenberg & Samuel

[57] ABSTRACT

An improved poppet valve is provided which includes a piston having a stem and a disk-shaped head attached to the stem. The piston is mounted to reciprocate in a cylinder, the internal wall of which has a seat formed therein to define a flow orifice between the cylinder seat and the disk-shaped head. The piston head includes a flat face on one side thereof and a working surface on the opposite face which is adapted to define the flow orifice with the cylinder seat. The working surface includes an annular face having a specifically defined shape and a portion connecting the annular face to the stem. The shape of the annular face significantly decreases the operating time of the valve to discharge the cylinder via the flow orifice. In one embodiment, the surface of the annular face has a conical shape and forms an angle in the range of 20° to 60° with the longitudinal axis of the stem. In a second embodiment, the surface of the annular face is in the shape of an arc having a radius of curvature in the range of 0.156" to 0.252".

3 Claims, 4 Drawing Figures

POPPET VALVE

This is a division of application Ser. No. 849,118, filed Nov. 7, 1977, now U.S. Pat. No. 4,168,118, which is a continuation of application Ser. No. 663,474, filed Mar. 3, 1976, now abandoned.

FIELD OF THE INVENTION

The present invention relates generally to poppet valves and specifically to an improved poppet valve in which the head of the piston is provided with a working surface having a specifically defined shape to significantly decrease the operating time of the valve to reach maximum pressure.

BACKGROUND OF THE INVENTION

Poppet valves are well known in the art and include a piston mounted for reciprocation within a cylinder. The piston includes a disk-like head attached to a stem, and the internal wall of the cylinder has a seat formed therein to define a flow orifice between the cylinder seat and the piston head. Typically, the piston is driven by a cam or by suitable pneumatic or hydraulic means. In operation, the fluid flows into the cylinder under pressure and causes the piston to reciprocate so that the piston head moves away from the cylinder seat, creating a flow orifice therebetween. The maximum pressure is obtained when the piston head moves away from the cylinder seat to define the largest flow orifice. After this occurs the downstream flow pressure decays to zero. The total time span for the cycle to occur only takes a few seconds, which time is critical in certain applications. For example, in aircraft, the poppet valves may be employed to control the opening of emergency exits so that the fastest possible operation is critical. In conventional poppet valves, the time required to discharge a 500 cubic inch cylinder charged to 3,000 PSIG is in the range of 4 to 5 seconds. Accordingly, as the discharge time is critical, it would be highly desirable to design a poppet valve which minimizes the operating time of the valve to reach maximum pressure and to discharge the cylinder.

Broadly, it is an object of the present invention to provide an improved poppet valve which overcomes the aforesaid problems. Specifically, it is within the contemplation of the present invention to provide an improved poppet valve which is constructed to significantly decrease the operating time of the valve to discharge the cylinder by specifically defining the shape of the working surface of the piston head which is adapted to engage the cylinder seat.

SUMMARY OF THE INVENTION

Briefly, in accordance with the principles of the present invention, there is provided an improved poppet valve including a cylinder and a piston mounted therein for reciprocation. The piston includes a stem and a disk-shaped head attached to the stem. The internal wall of the cylinder has a seat formed therein, and the piston is movable relative to the cylinder to define a flow orifice for fluid between the cylinder seat and the piston head. The disk-shaped head has a flat face formed on one side thereof and a working surface on the opposite face. The working surface includes an annular face having a specifically defined shape to improve the operating time of the valve to discharge the cylinder, and a portion connecting the annular face to the stem.

In one embodiment, the annular face has a conical shape and forms an angle in the range of 20° to 60° with the longitudinal axis of the stem.

In a second embodiment, the annular face of the working surface is in the shape of an arc and has a radius of curvature in the range of 0.156" to 0.252".

Advantageously, the construction and shape of the working surface of the disk-shaped piston head of the present invention significantly improves the operating time of the valve to discharge the cylinder. Additionally, the specifically defined shape of the working surface of the present invention significantly decreases the operating time for the valve to attain maximum pressure. For example, in conventional poppet valves, the discharge time to reach maximum pressure for a 500 cubic inch cylinder charged to 3,000 PSIG is in the range of four to five seconds. However, as a result of the present invention, the operating time to reach maximum pressure has been decreased by approximately one half of a second. This is particularly significant, especially in various applications where such operating time is critical and must be minimized.

BRIEF DESCRIPTION OF THE DRAWINGS

Further objects, features, and advantages of the present invention will become apparent upon the consideration of the following detailed description of presently preferred embodiments when taken in conjunction with the accompanying drawings, wherein.

DETAILED DISCUSSION OF PREFERRED EMBODIMENTS OF THE INVENTION

Figures 1, 2, 3, 4:
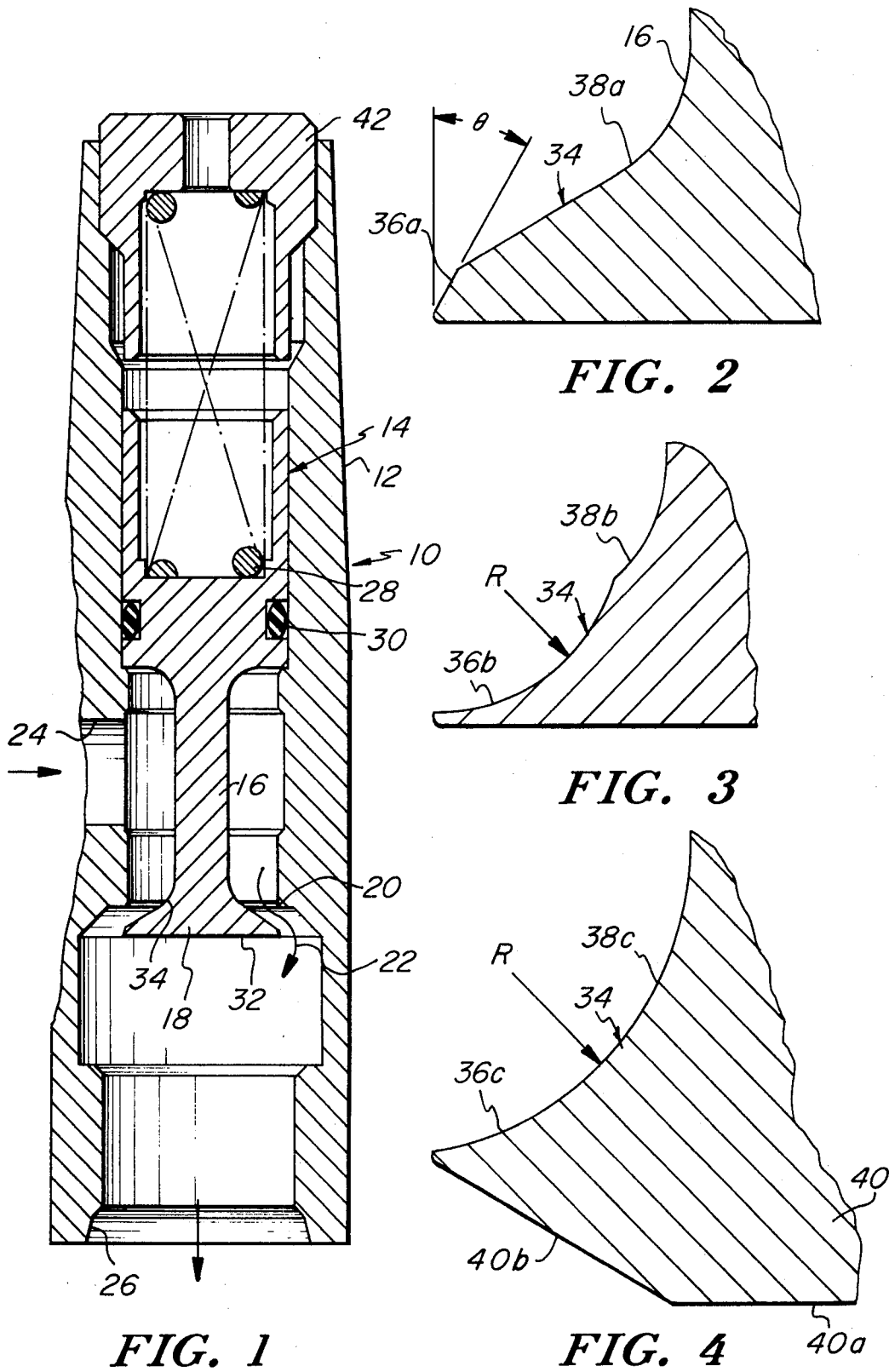
FIG. 1 is a cross-sectional view of the improved poppet valve of the present invention illustrating the flow orifice defined between the cylinder seat and the piston head.
FIG. 2 is a detailed sectional view, partially broken away, of a first embodiment of the piston head incorporating the concept of the present invention.
FIG. 3 is a detailed sectional view, partially broken away, illustrating a second embodiment of the piston head incorporating the concept of the present invention.
FIG. 4 is a detailed sectional view, partially broken away, illustrating a third embodiment of the piston head incorporating the concept of the present invention.

Referring now to FIG. 1, there is shown the improved poppet valve of the present invention, generally designated by the reference numeral 10, which includes a cylinder 12 and a piston 14 mounted within cylinder 12 for reciprocation. Piston 14 includes a stem 16 which forms no part of the present invention and a novel disk-shaped head 18 attached to the end of stem 16. The internal wall of cylinder 12 has an annular seat or chamber 20 formed therein. Accordingly, piston 14 reciprocates relative to cylinder 12 to define a flow orifice, designated by arrow 22, between seat 20 and piston head 18. In a conventional manner, cylinder 12 is provided with an inlet port 24 through which a suitable gas or fluid may flow and an outlet port 26. Also in a conventional manner, piston 14 is provided with springs 28 for advancing head 18 to its open position, suitable pressure seals shown at 30, and an adjustment cap 42.

The disk-shaped piston head includes two faces: a flat face 32 on one side of the piston head 18 and a working surface 34 on the opposite face of piston head 18 which in operation is adapted to coact with cylinder seat 20 to define flow orifice 22. In accordance with the present invention, the working surface 34 includes an annular face 36 having a specifically defined shape and a portion 38 connecting annular face 36 to piston 14.

Turning now to FIG. 2, there is shown a first embodiment of piston head 18 incorporating the concepts of the present invention. More particularly, working surface 34 includes an annular face 36a which is in the shape of a portion of a cone and is herein referred to as having a conical shape. Portion 38a connects annular face 36a to stem 16. The conical-shaped annular face 36a forms an angle in the range of 20° to 60° with the longitudinal axis of stem 16. As a result of the working surface of the piston head having such a shape, the operating time of the valve to attain maximum pressure and to discharge the cylinder is significantly decreased. For example, in discharging a 500 cubic inch cylinder charged to 3,000 PSI, conventional poppet valves have an operating time to reach maximum pressure of slightly greater than four seconds. However, as a result of the present invention, by forming annular face 36a within the stated range there is a significant decrease in the operating time for reaching maximum pressure of approximately one half of a second. This faster response is particularly advantageous in certain applications, such as control valves for emergency exits, in which minimum operating time is critical.

Turning now to FIG. 3, there is shown a second embodiment of piston head 18 employing the concepts of the present invention. More particularly, working surface 34 includes an annular face 36b which forms a portion of a circle and is herein referred to as arc-shaped. A portion 38b connects face 36b to stem 16. In the particular embodiment illustrated, circular face 36b is provided with a radius of curvature of 0.156". In accordance with the present invention, it has been found that a piston head having a working surface with such a radius of curvature also significantly decreases the operating time of the poppet valve to discharge the cylinder.

Turning now to FIG. 4, there is shown a third embodiment of piston head 18 incorporating the concepts of the present invention. The working surface 34 includes an annular face 36c which forms a portion of a circle and is herein referred to as an arc-shaped face. In addition, a portion 38c connects face 36c to stem 16. In this particular embodiment, arc-shaped face 36c has a radius of curvature of 0.252" and also significantly decreases the operating time of the valve to discharge a cylinder.

Moreover, in accordance with the principles of the present invention, it has been found that arc-shaped face 36b or 36c may have a radius of curvature anywhere in the range between 0.156" and 0.252". As a result of tests which have been conducted, an arc-shaped face having a radius of curvature within this range significantly decreases the operating time to attain maximum pressure when discharging the cylinder. However, it has also been found that outside this range, such superior performance results are not obtained.

Referring again specifically to the embodiment of FIG. 4, there is illustrated a piston head 18 provided with an extension 40 extending from the otherwise flat face 32. Face 40a of extension 40 is also substantially flat and the annular edge 40b which connects extension 40 to arc-shaped face 36c forms an angle of 60° with respect to the longitudinal axis of stem 16. Extension 40 provides a support to strengthen piston head 18 which has been made thinner by the removal of material to form arc-shaped face 36c having a relatively large radius of curvature. Accordingly, extension 40 operates to strengthen piston head 18 to prevent damage or breaking of the piston head 18 of the present invention which has a somewhat thinner cross-section than conventional piston heads for poppet valves.

A latitude of modification, change, and substitution is intended in the foregoing disclosure and, in some instances, some features of the invention will be employed without a corresponding use of other features. Accordingly, it is appropriate that the appended claims be construed broadly and in a manner consistent with the spirit and scope of the invention herein.

What is claimed is:

1. A poppet valve for a regulator for discharging fluid from a pressurized vessel comprising:

a piston including a stem and a disk-shaped head attached to said stem, said stem and said head each having a surface facing each other and on which opposite forces are applied by fluid from said pressurized vessel;

a cylinder defining a bore in which said piston is mounted for reciprocation, the internal wall of said cylinder having an annular beveled surface formed therein, said piston being movable relative to said cylinder to define a fluid flow orifice for the flow of fluid between said beveled surface and said piston head;

resilient means within said cylinder for applying a force on said piston to maintain said fluid flow orifice normally open; said cylinder wall including stop means for acting against said resilient means to stop said piston;

said disk-shaped piston head having a first face on one side thereof and a working surface on the opposite face thereof; said first face being flat in one plane and constructed and arranged to have a force applied thereto tending to partially restrict said fluid flow orifice while said working surface cooperates with said annular beveled surface to regulate and shape the flow of fluid through said orifice;

said working surface including an arc-shaped annular face, and a portion connecting said annular face to said stem; and said arc-shaped annular face having a radius of curvature in the range of 0.156" to 0.252" to thereby significantly decrease the operating time of said valve to discharge fluid from said pressurized vessel via said flow orifice.

2. A poppet valve in accordance with claim 1 wherein said disk-shaped piston head includes an extension formed on said first face for strengthening said piston head.

3. A poppet valve in accordance with claim 2 wherein said extension includes a flat face and an annular edge which forms an angle with the longitudinal axis of said stem.

* * * * *